United States Patent
Boyanich

(10) Patent No.: US 10,024,471 B2
(45) Date of Patent: Jul. 17, 2018

(54) HOSE BARB LEAK, BLOWOUT AND DAMAGE PREVENTION SYSTEM

(71) Applicant: Dairy Industry a Corporation, Napa, CA (US)

(72) Inventor: John Robert Boyanich, American Canyon, CA (US)

(73) Assignee: DAIRY INDUSTRY A CORPORATION, Napa, CA (US)

( * ) Notice: Subject to any disclaimer, the term of this patent is extended or adjusted under 35 U.S.C. 154(b) by 271 days.

(21) Appl. No.: 15/136,645

(22) Filed: Apr. 22, 2016

(65) Prior Publication Data
US 2016/0312937 A1    Oct. 27, 2016

Related U.S. Application Data

(60) Provisional application No. 62/151,210, filed on Apr. 22, 2015.

(51) Int. Cl.
| | |
|---|---|
| *F16L 33/00* | (2006.01) |
| *F16L 33/22* | (2006.01) |
| *F16L 33/28* | (2006.01) |
| *F16L 33/04* | (2006.01) |

(52) U.S. Cl.
CPC ............. *F16L 33/223* (2013.01); *F16L 33/28* (2013.01); *F16L 33/04* (2013.01)

(58) Field of Classification Search
CPC ......... F16L 33/06; F16L 33/28; F16L 33/223; F16L 33/23; F16L 33/222; F16L 33/2073; F16L 33/207; F16L 33/2071; F16L 33/04
USPC ....... 285/252, 253, 250, 247, 251, 259, 242, 285/256
See application file for complete search history.

(56) References Cited

U.S. PATENT DOCUMENTS

| | | | | |
|---|---|---|---|---|
| 1,808,094 A | * | 6/1931 | Yackey ................. | F16L 33/221 285/148.16 |
| 3,711,131 A | * | 1/1973 | Evans ................. | F16L 33/2073 285/256 |
| 4,369,992 A | * | 1/1983 | Fournier ............. | F16L 33/2076 285/256 |
| 6,050,612 A | * | 4/2000 | Wolterman ............. | E21B 17/00 138/174 |
| 6,361,082 B1 | * | 3/2002 | Hauki ................... | F16L 33/006 24/279 |

(Continued)

FOREIGN PATENT DOCUMENTS

| | | | | |
|---|---|---|---|---|
| EP | | 66742 A1 | * 12/1982 | |
| GB | | 2177769 A | * 1/1987 | ............. F16L 33/02 |

*Primary Examiner* — Aaron M Dunwoody

(57) ABSTRACT

An apparatus for preventing hose barb leaks, blowouts, and damages contains a hose barb, a bumper, and a band clamp. The hose barb has a double configured hose barb serration arrangement for preventing leaks and blowouts. In particular, the hose barb has a pair of reverse-angled serrations and a plurality of secondary serrations. Additionally, the hose barb also includes a first threaded portion and a shaft portion. The first threaded portion engages to a second threaded portion of the bumper. When the apparatus is in use, the hose portion is pressed against the pair of reverse-angled serrations and the plurality of secondary serrations using the band clamp. In order to do so, the band clamp is positioned adjacent the bumper such that a body of the band clamp perimetrically surrounds the pair of reverse-angled serrations and the plurality of secondary serrations.

13 Claims, 12 Drawing Sheets

(56) References Cited

U.S. PATENT DOCUMENTS

| | | | | |
|---|---|---|---|---|
| 2002/0167166 A1* | 11/2002 | Klein | ............ | F16L 33/227 |
| | | | | 285/239 |
| 2006/0226650 A1* | 10/2006 | Alder | ............ | F16L 33/2076 |
| | | | | 285/259 |
| 2010/0102552 A1* | 4/2010 | Lockhart | ............ | B29C 47/28 |
| | | | | 285/256 |

* cited by examiner

HOSE BARB LEAK, BLOWOUT AND DAMAGE PREVENTION SYSTEM

The current application claims a priority to the U.S. Provisional Patent application Ser. No. 62/151,210 filed on Apr. 22, 2015.

FIELD OF THE INVENTION

The present invention relates generally to an apparatus and system for a hose barb system. More specifically, the present invention introduces an apparatus which has increased efficiency and is also reusable.

BACKGROUND OF THE INVENTION

Hose barbs are used in a wide variety of industries. Along with these hose barbs, different retention products such as strap banding, crimping, and worm-gear type clamping are used. Even though these products are considerably effective they have certain disadvantages as well.

As an example, some of the retention products are not always leak proof. Therefore, when the product is being used with a liquid, which can vary from one industry to the other, the liquid tends to get in between the hose barb and the hose. In order to prevent this issue, a tight seal between the hose barb and the hose is essential. As an example, when considering the hose barbs in the wine industry, wine gets in between the hose barb and the hose resulting in undesired leaks and potential contamination.

Another disadvantage with the existing retention products is the difficulty in assembling the product. More specifically, specialized tools are required to assemble the device. The need for specialized products can be time consuming and costly to the user. Therefore, a retention product that can be easily fixed or removed on-site for assembling and repairing purposes can be very beneficial.

The reusability and durability is another major concern with existing retention products. Moreover, most retention products are designed for one-time use. Dragging and slamming hose barbs and hose barb retention products is very common in the industry. Resultantly, the components are damaged over time. In order to minimize long term costs, a method for protecting the related components is required.

The objective of the present invention is to address the aforementioned issues. More specifically, the present invention introduces an apparatus that can be used in different industries to overcome hose barb related issues. As an example, the leakage issues related with traditional hose barb systems has been resolved through the present invention. Moreover, the present invention introduces an effective design such that the hose barb related components are protected for multiple use and can also be assembled or disassembled on-site with regular tools.

DETAIL DESCRIPTIONS OF THE INVENTION

All illustrations of the drawings are for the purpose of describing selected versions of the present invention and are not intended to limit the scope of the present invention.

The present invention introduces a device to eliminate hose barb leaking, provide secure hose barb retention, and protect hose barb related components from damage to be reused on multiple occasions. More specifically, the present invention addresses issues that are prevalent with existing hose barb retention products. Therefore, by utilizing the present invention, long term costs related to hose barbs can be minimized and productivity in the industry can be increased.

Figure 1:
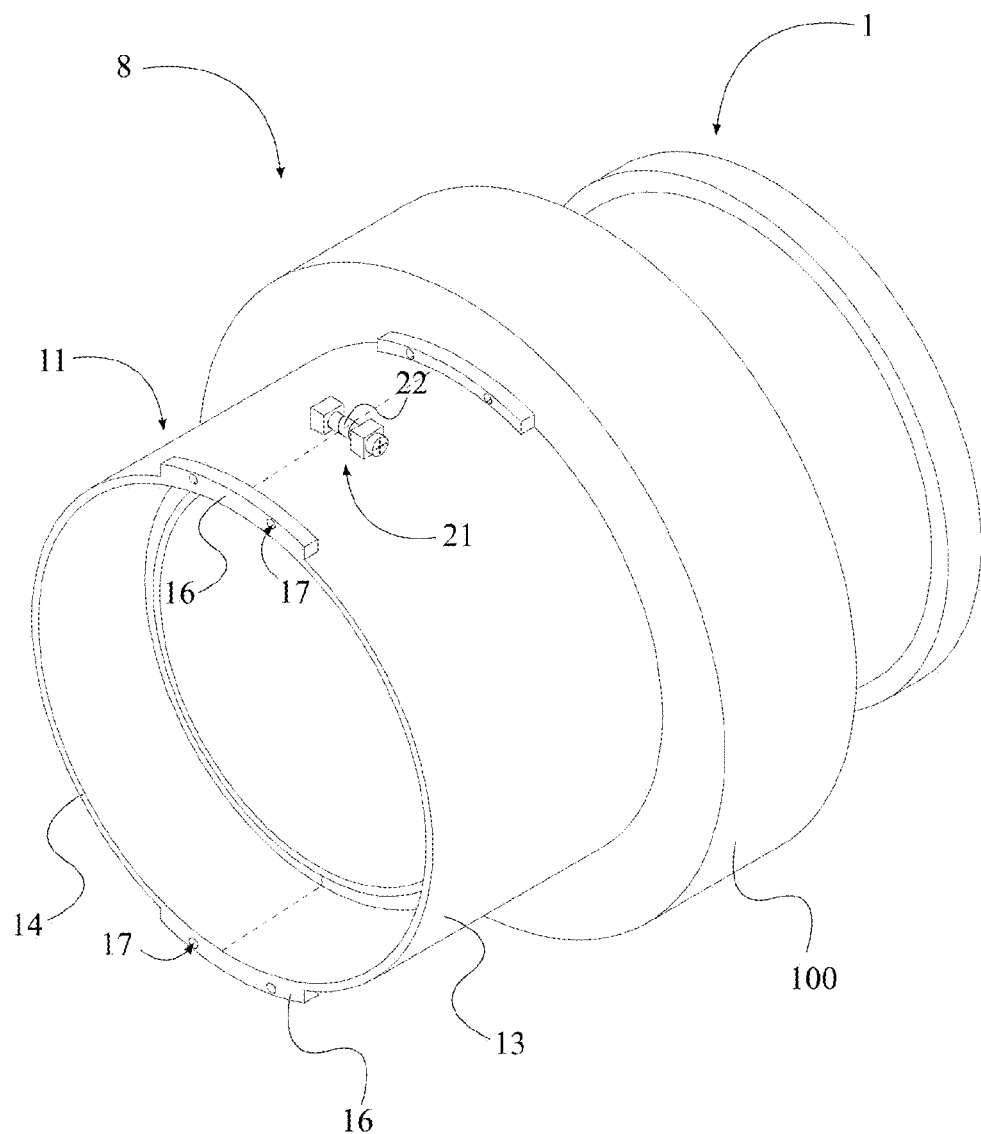
FIG. 1 is a perspective view of the present invention.
Figure 2:
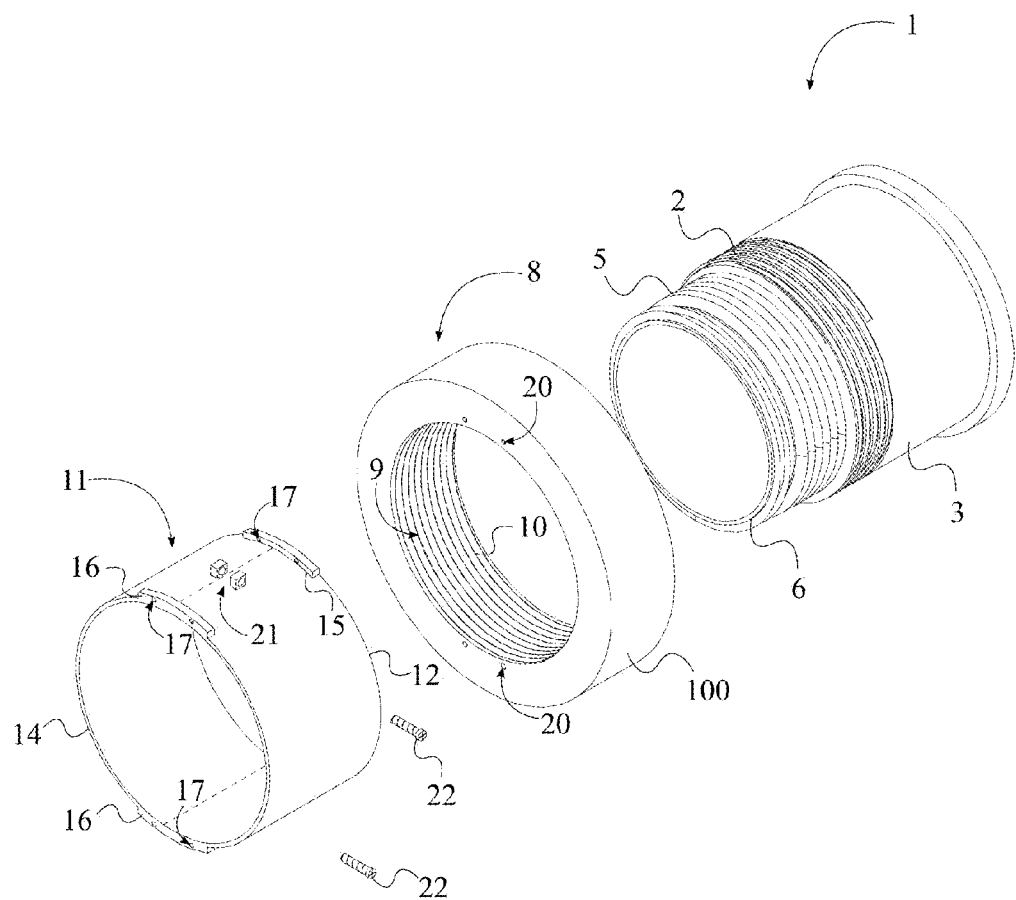
FIG. 2 is an exploded view of the present invention.
Figure 3:
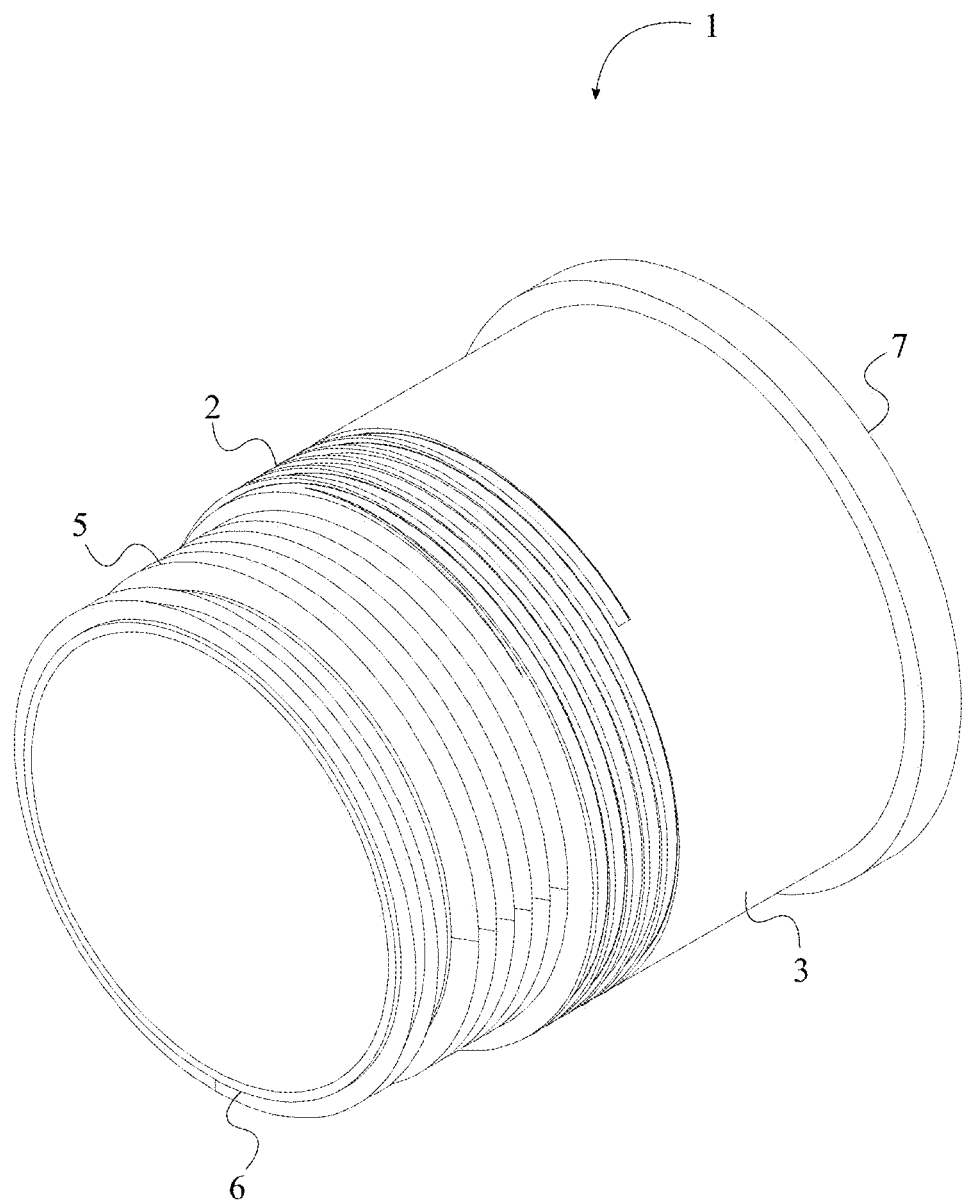
FIG. 3 is a perspective view of the hose barb of the present invention.
Figure 4:
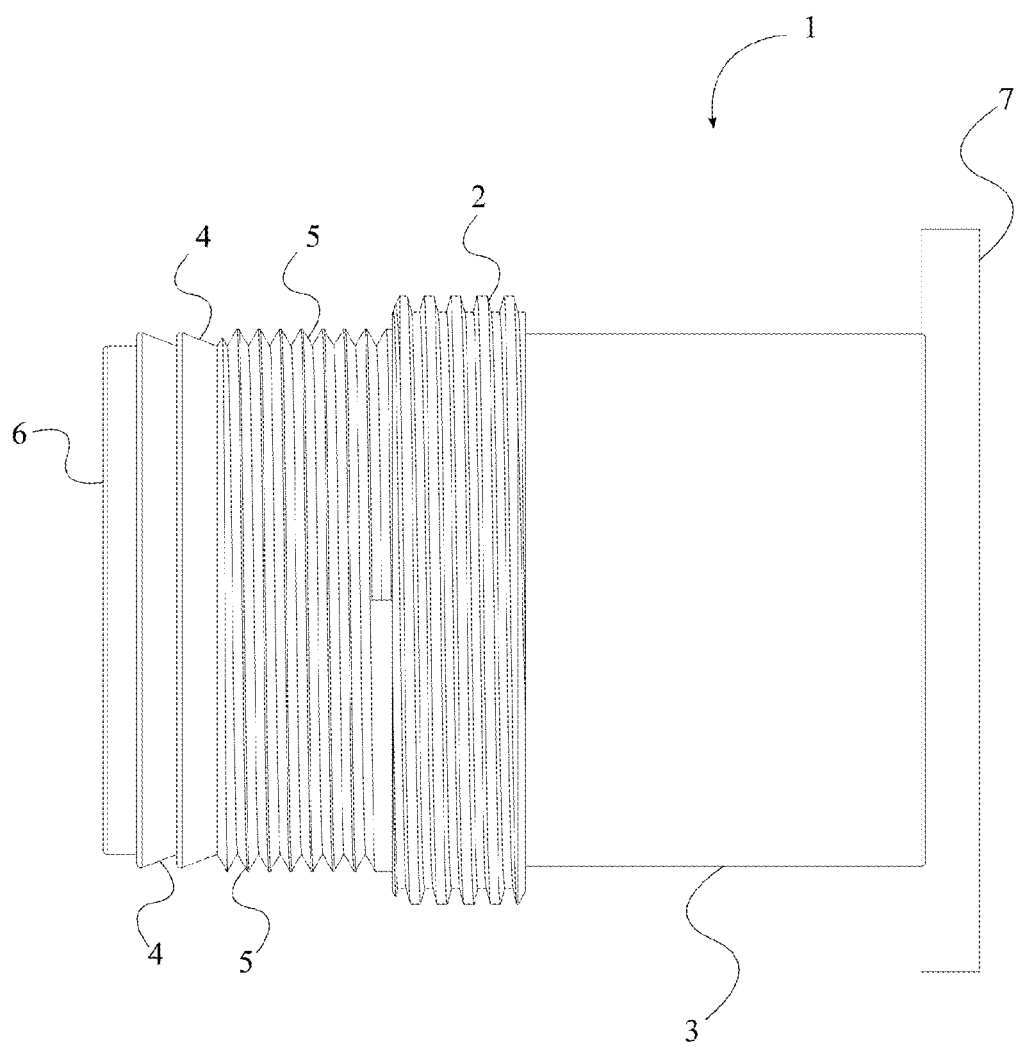
FIG. 4 is a side view of the hose barb.
Figure 5:
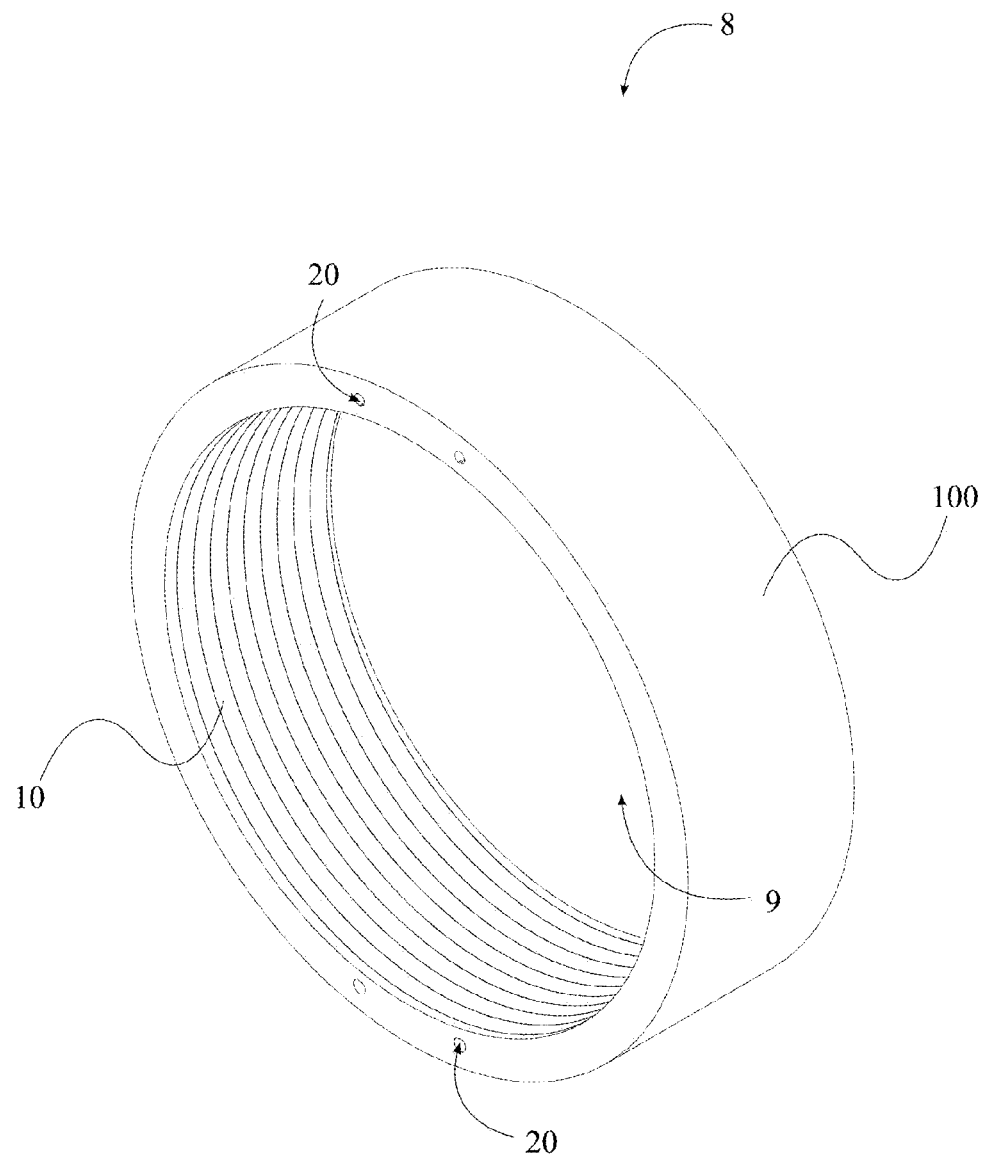
FIG. 5 is a perspective view of the bumper.

As illustrated in FIG. 1 and FIG. 2, the present invention comprises a hose barb 1, a bumper 8, and a band clamp 11 which are concentrically aligned with each other. The hose barb 1 is specifically designed to prevent leaks from occurring. In order to do so, the hose barb 1 comprises a first threaded portion 2, a shaft portion 3, a pair of reverse-angled serrations 4, and a plurality of secondary serrations 5 as illustrated in FIG. 3 and FIG. 4. More specifically, the pair of reverse-angled serrations 4 and the plurality of secondary serrations 5 can be referred to as a double configured hose barb serration arrangement. In the preferred embodiment of the present invention, the first threaded portion 2 is a male threaded portion. However, the first threaded portion 2 can be a female threaded portion in another embodiment of the present invention. The shaft portion 3 traverses through an opening 9 of the bumper 8, which is centrally positioned on the bumper 8. The opening 9 is specifically designed to snugly fit around the shaft portion 3. However, the opening 9 is also sufficiently sized to allow the user to conveniently move the bumper 8 along the shaft portion 3. The bumper 8, which is a nylon bumper 8 in the preferred embodiment of the present invention, is intended to protect both the hose barb 1 and the band clamp 11. The bumper 8 properties can vary in different embodiments of the present invention. The pair of reverse-angled serrations 4 is used to prevent liquid from getting in between the hose barb 1 and a hose. More specifically, the pair of reverse-angled serrations 4 create multiple angles when the hose is compressed against the hose barb 1. The multiple angles lead to creating an O-ring type seal between the hose and the hose barb 1 preventing any liquid from getting in between the hose and the hose barb 1. On the other hand, the plurality of secondary serrations 5 is used to prevent hose blowouts. In the preferred embodiment of the present invention, each of the plurality of secondary serrations 5 are directed upwards to make contact with the hose. The direction of each of the plurality of secondary serrations 5 creates a deep crevice for the hose to be compressed into such that any gap in between the hose barb 1 and the hose is minimized. As an example, if the present invention is used in the wine industry, the pair of reverse-angled serrations 4 prevent wine from getting in between the hose barb 1 and the hose. In doing so, the pair of reverse-angled serrations 4 and the plurality of secondary serrations 5 are positioned along the shaft portion 3 which is cylindrical in shape. More specifically, the plurality of secondary serrations 5 is positioned adjacent the pair of reverse-angled serrations 4. As seen in FIG. 5, the bumper 8 comprises a second threaded portion 10 which is used when positioning the bumper 8. In the preferred embodiment of the present invention, the second threaded portion 10 is a female threaded portion. However, the second threaded portion 10 can be a male threaded portion in another embodiment of the present invention. The second threaded portion 10 is positioned around the opening 9. Therefore, when the shaft portion 3 traverses the opening 9, the first threaded portion 2 is engaged to the second threaded portion 10. The band clamp 11 is intended to fasten a hose against the hose barb 1 and provide hose blowout protection. In doing so, the band clamp 11 is positioned adjacent the bumper 8. More specifically, the band clamp 11 is positioned around the plurality of secondary serrations 5 and the pair of reverse-angled serrations 4 such that the band clamp 11 perimetrically surrounds the plurality of secondary serrations 5 and the pair of reverse-angled serrations 4. In other words, the band clamp 11 presses the hose into and against the plurality of secondary serrations 5 and the pair of reverse-angled serrations 4.

The hose barb 1 further comprises a proximal end 6 and a distal end 7 such that the shaft portion 3 extends from the proximal end 6 to the distal end 7. The length and shape of the shaft portion 3 can vary in different embodiments of the present invention. The pair of reverse-angled serrations 4 is positioned adjacent the proximal end 6. Moreover, the plurality of secondary serrations 5 which is positioned adjacent the pair of reverse-angled serrations 4 is positioned opposite the proximal end 6. Additionally, the plurality of secondary serrations 5 extends from the pair of reverse-angled serrations 4 towards the distal end 7. The first threaded portion 2 which is also positioned along the shaft portion 3 is adjacent the plurality of secondary serrations 5 and opposite the pair of reverse-angled serrations 4. Therefore, when the first threaded portion 2 is engaged to the second threaded portion 10, the bumper 8 is positioned in between the distal end 7 and the proximal end 6.

Figure 7:
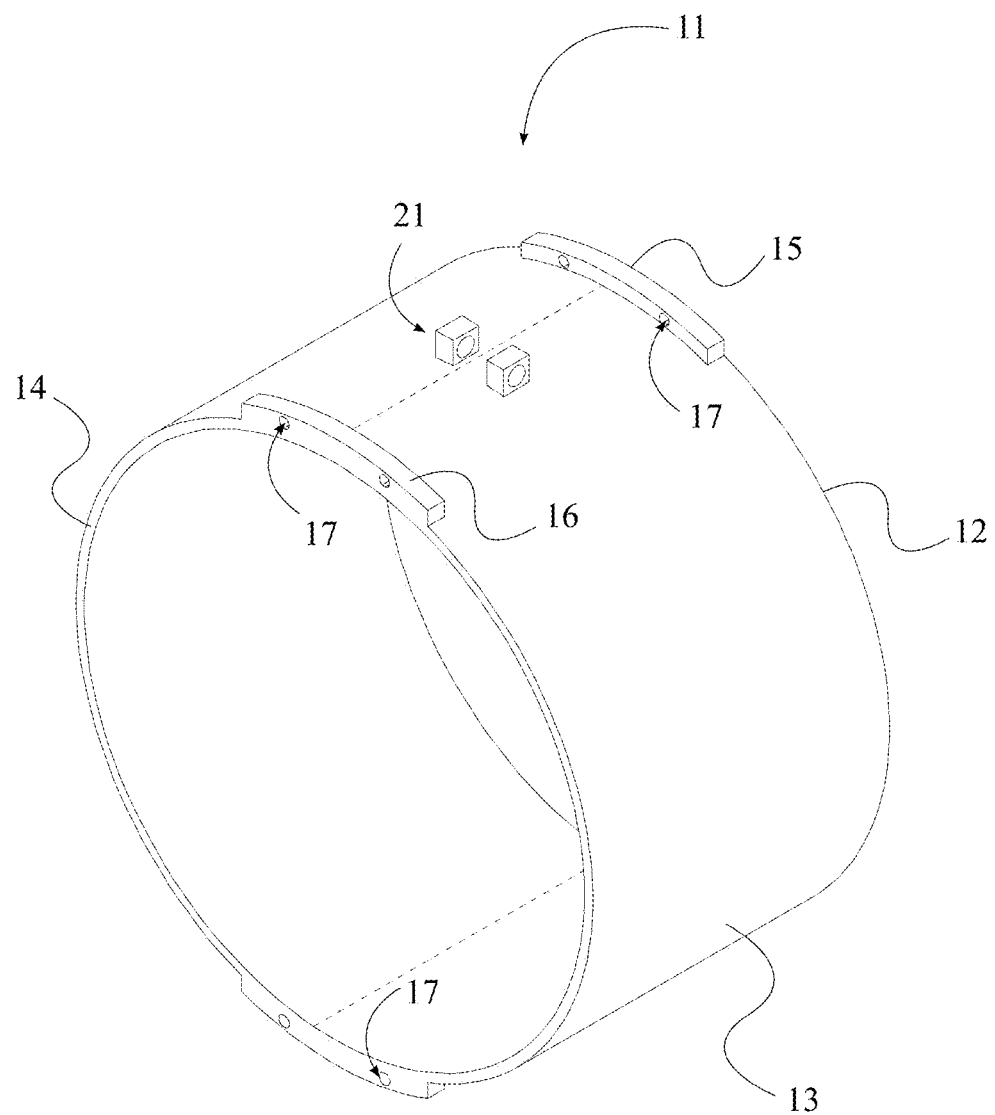
FIG. 7 is a perspective view of the band clamp.
Figure 8:
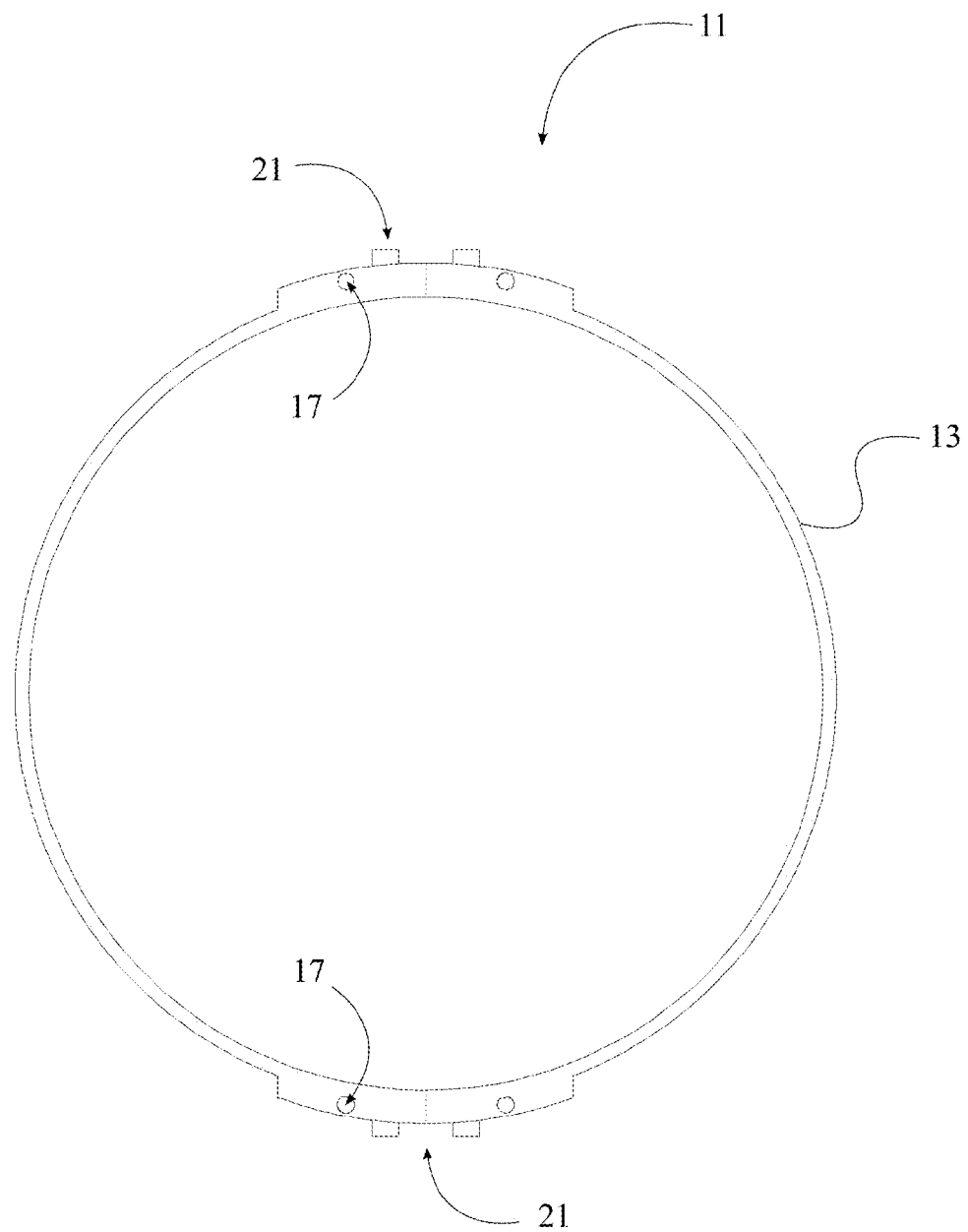
FIG. 8 is a top view of the band clamp.

As seen in FIG. 7 and FIG. 8, the band clamp 11 used in the preferred embodiment of the present invention comprises a first edge 12, a body 13, and a second edge 14. The body 13 which extends from the first edge 12 to the second edge 14 determines the width of the band clamp 11. When the band clamp 11 is positioned around the plurality of secondary serrations 5 and the pair of reverse-angled serrations 4, the first edge 12 is positioned adjacent the bumper 8. More specifically, the plurality of secondary serrations 5 and the pair of reverse-angled serrations 4 are perimetrically surrounded by the body 13.

Figure 9:
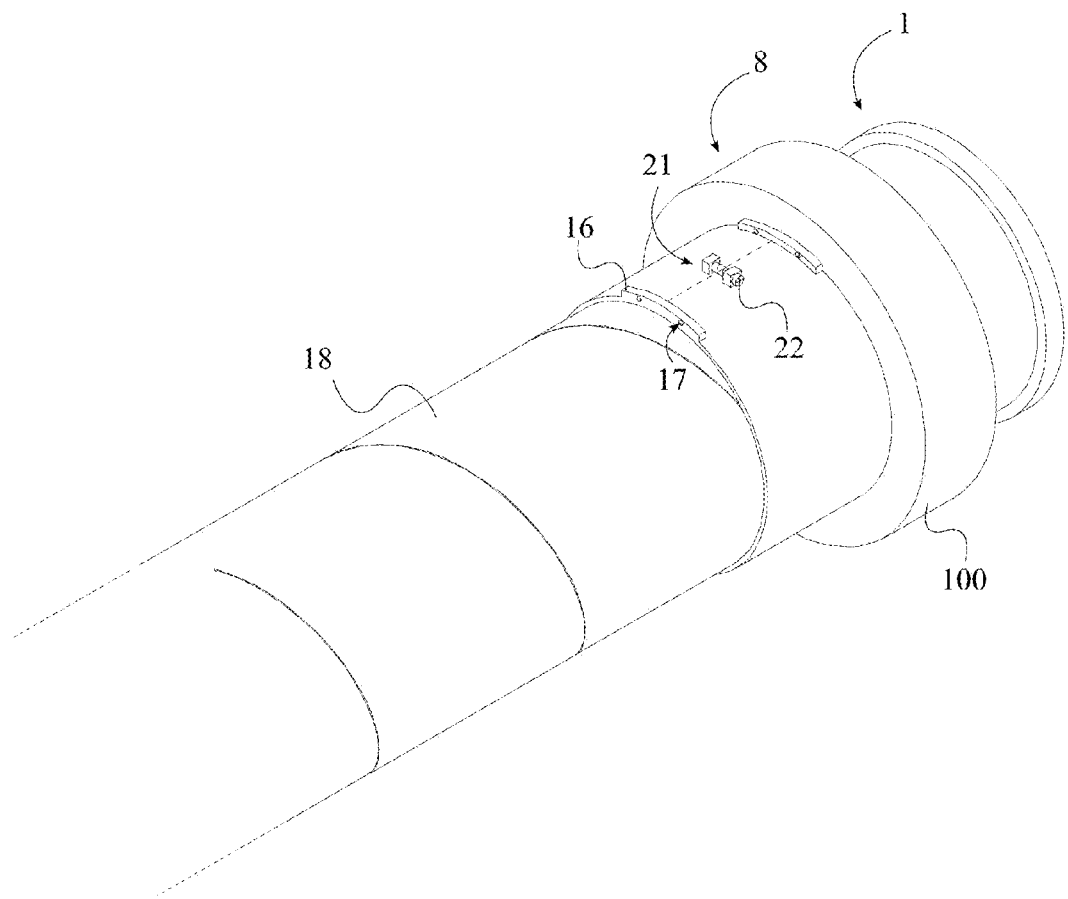
FIG. 9 is a perspective view in which the present invention is used with the hose section.
Figure 10:
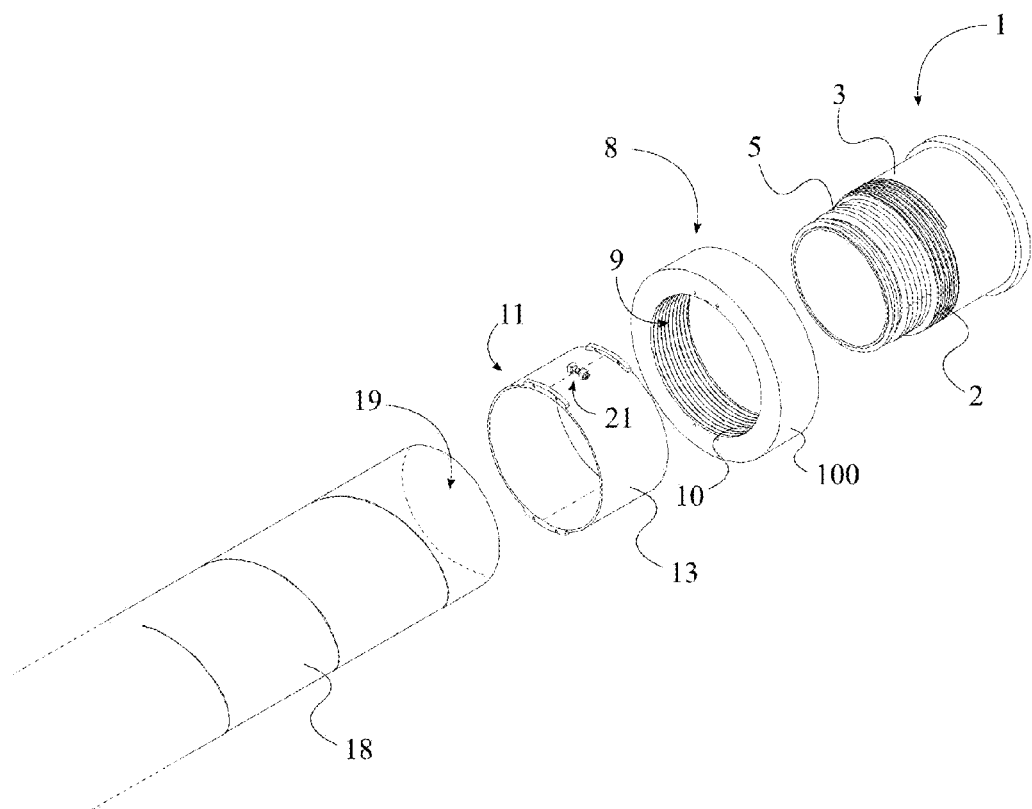
FIG. 10 is an exploded view of the hose section and the present invention.

As illustrated in FIG. 9 and FIG. 10, the present invention is intended to be used with a hose portion 18. The hose portion 18 can be used to represent a standard hose used in the industry. The hose portion 18 comprises a hose opening 19 which is used as an outlet for the liquid. When the present invention is being used with the hose portion 18, the hose barb 1, the bumper 8, the hose opening 19, and the band clamp 11 are concentrically aligned to each other. The hose portion 18 is positioned such that the pair of reverse-angled serrations 4 and the plurality of secondary serrations 5 are positioned through the hose opening 19. In the preferred embodiment of the present invention, the plurality of secondary serrations 5 is positioned at an angle such that the hose barb 1 can be conveniently positioned through the hose opening 19. The angle in which each of the plurality of secondary serrations 5 is positioned in eliminates the need to use special tools when positioning the pair of reverse-angled serrations 4 and the plurality of secondary serrations 5 through the hose opening 19. In the preferred embodiment of the present invention, the hose barb 1 is pressed against the hose portion 18 when positioned through the hose opening 19. In order to do so, an outer diameter of the pair of reverse-angled serrations 4 is marginally less than an outer diameter of the plurality of secondary serrations 5. Moreover, the plurality of secondary serrations 5 is arranged in a threaded configuration so that when positioned through the hose opening 19, a twisting action conveniently positions the hose barb 1 into the hose opening 19. When the hose portion 18 is in the preferred position, the hose portion 18 is then clamped in between the band clamp 11 and the hose barb 1 by fastening the band clamp 11.

Figure 6:
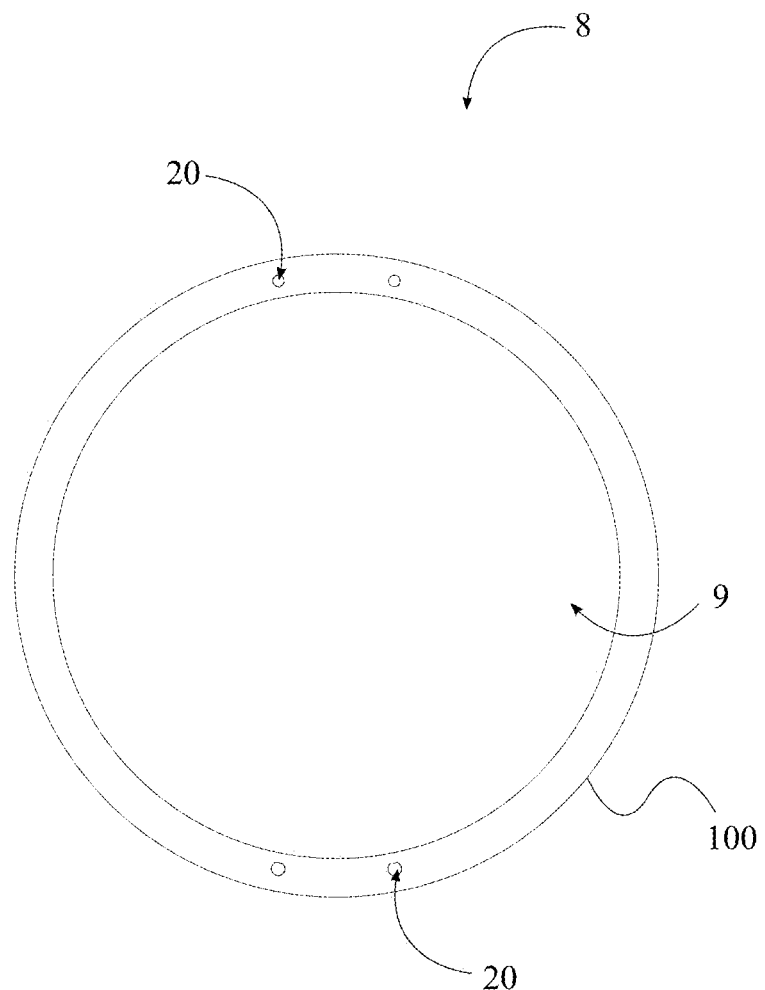
FIG. 6 is a top view of the bumper.
Figure 11:
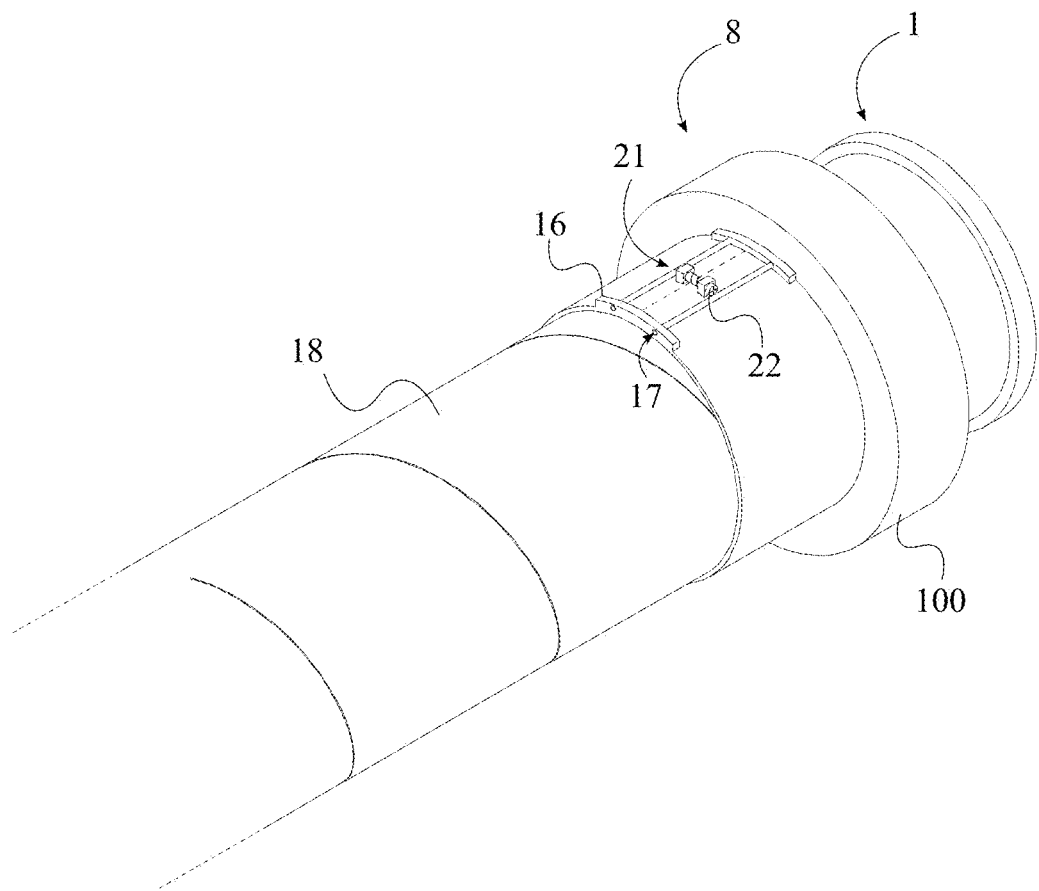
FIG. 11 is a perspective view in which the band clamp and the bumper are secured together by using the plurality of bolt receiving holes and the plurality of corresponding holes.
Figure 12:
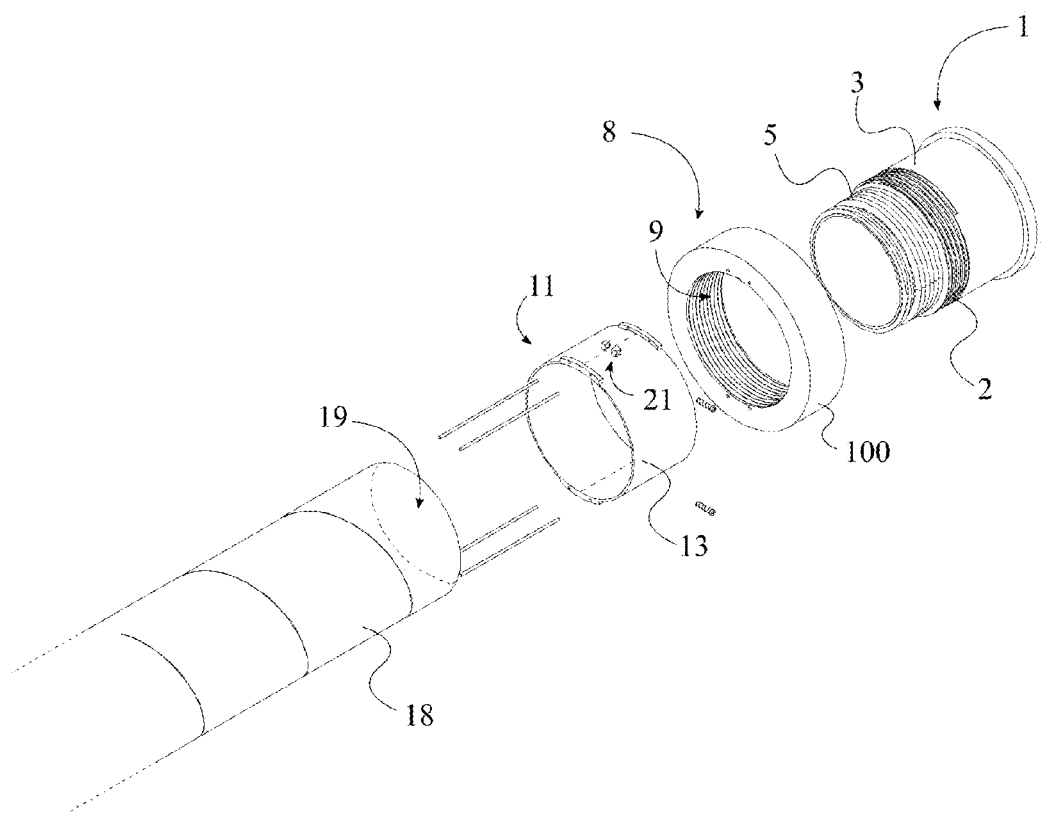
FIG. 12 is an exploded view in which the band clamp and the bumper are secured together by using the plurality of bolt receiving holes and the plurality of corresponding holes.

Hose barbs are used in varying conditions. As an example, the hose barb 1 can be used in high pressure conditions. Therefore, the present invention needs to be designed to withstand these varying conditions. In order to do so, the present invention comprises a plurality of bolt receiving holes 20 in another embodiment of the present invention. The plurality of bolt receiving holes 20 is radially positioned around the opening 9 and traverses through the bumper 8 as shown in FIG. 5 and FIG. 6. In order to correspond to the plurality of bolt receiving holes 20, the band clamp 11 comprises a plurality of corresponding holes 17. In order to position the plurality of corresponding holes 17 the band clamp 11 also comprises a first protruding lip 15 and a second protruding lip 16. The first protruding lip 15 is positioned opposite the second protruding lip 16 across the body 13. The plurality of corresponding holes 17 perpendicularly traverses through both the first protruding lip 15 and the second protruding lip 16. In order to do so, the first protruding lip 15 is aligned with the second protruding lip 16. When the band clamp 11 is positioned adjacent the bumper 8, the plurality of corresponding holes 17 is aligned with the plurality of bolt receiving holes 20. Therefore, as illustrated in FIG. 11 and FIG. 12, a set of bolts can be inserted into the plurality of bolt receiving holes 20 and the plurality of corresponding holes 17 simultaneously such that the hose barb 1, the bumper 8, and the band clamp 11 are secured against each other.

As discussed earlier, the band clamp 11 is used to press the hose portion 18 against the hose barb 1. The size, shape, and fastening mechanism of the band clamp 11 can change in different embodiments of the present invention. The band clamp 11 used in the preferred embodiment of the present invention comprises of two halves which fasten together with a banding mechanism 21. However, the size and shape of the band clamp 11 can vary in different embodiments of the present invention to accommodate varying hose diameters. The banding mechanism 21 is integrated into the body 13 of the band clamp 11 opposite to the shaft portion 3. More specifically, the banding mechanism 21 is positioned in between the first edge 12 and the second edge 14. The positioning of the band mechanism allows the user to fasten the band clamp 11 conveniently. In the preferred embodiment of the present invention, the banding mechanism 21 comprises a plurality of bolts 22. When used with the band clamp 11, the plurality of bolts 22 is positioned in between the body 13 and the outer surface 100 of the bumper 8. Since the outer surface 100 makes initial contact with an external surface, the plurality of bolts 22 is protected from impact.

When utilizing the present invention, the following process flow is generally followed. Initially, the bumper 8 is positioned along the shaft portion 3 by engaging the first threaded portion 2 with the second threaded portion 10. Next, the proximal end 6 is pushed or twisted into the hose opening 19 such that the hose portion 18 is positioned along the plurality of secondary serrations 5 and the pair of reverse-angled serrations 4. The proximal end 6 is positioned such that the first threaded portion 2 is aligned with an end of the hose opening 19. Next the band clamp 11 is positioned around the hose portion 18 and adjacent to the bumper 8. Afterwards, the band clamp 11 is fastened through the banding mechanism 21. In doing so, the plurality of bolts 22 is fastened. If the present invention is being used in a high pressure environment and the bumper 8 needs to be fastened to the band clamp 11, the plurality of bolt receiving holes 20 and the plurality of corresponding holes 17 are used for fastening purposes.

Although the invention has been explained in relation to its preferred embodiment, it is to be understood that many other possible modifications and variations can be made without departing from the spirit and scope of the invention as hereinafter claimed.

What is claimed is:
1. A device for hose barb retention comprises:
   a hose barb;
   a bumper;
   a band clamp;
   the hose barb comprises a first threaded portion, a shaft portion, a pair of reverse-angled serrations, and a plurality of secondary serrations;
   the hose barb, the bumper, and the band clamp being concentrically aligned with each other;
   the shaft portion traversing through an opening of the bumper, wherein the opening is centrally positioned on the bumper;
   the pair of reverse-angled serrations and the plurality of secondary serrations being positioned along the shaft portion;
   the plurality of secondary serrations being positioned adjacent the pair of reverse-angled serrations;
   a second threaded portion of the bumper being positioned around the opening;
   the first threaded portion being engaged to the second threaded portion;
   the band clamp being positioned adjacent the bumper; and
   the band clamp being positioned around the plurality of secondary serrations and the pair of reverse-angled serrations, wherein the band clamp perimetrically surrounds the plurality of secondary serrations and the pair of reverse-angled serrations.

2. The device for hose barb retention as claimed in claim 1 comprises:
   the hose barb further comprises a proximal end and a distal end;
   the shaft portion extending from the proximal end to the distal end;
   the pair of reverse-angled serrations positioned adjacent the proximal end;
   the first threaded portion being positioned along the shaft portion and adjacent the plurality of secondary serrations opposite the pair of reverse-angled serrations;
   the plurality of secondary serrations being positioned adjacent to the pair of reverse-angled serrations and opposite to the proximal end; and
   the bumper being positioned in between the distal end and the proximal end.

3. The device for hose barb retention as claimed in claim 2, wherein the plurality of secondary serrations extends from the pair of reverse-angled serrations towards the distal end.

4. The device for hose barb retention as claimed in claim 1 comprises:
   the band clamp comprises a first edge, a body, and a second edge;
   the body extending from the first edge to the second edge;
   the first edge being positioned adjacent to the bumper; and
   the plurality of secondary serrations and the pair of reverse-angled serrations being perimetrically surrounded by the body.

5. The device for hose barb retention as claimed in claim 1 comprises:
   a hose portion;
   the hose portion comprises a hose opening;
   the hose barb, the bumper, the hose opening, and the band clamp being concentrically aligned to each other;
   the pair of reverse-angled serrations and the plurality of secondary serrations being positioned through the hose opening; and
   the hose portion being clamped in between the band clamp and the hose barb.

6. The device for hose barb retention as claimed in claim 1 comprises:
   a plurality of bolt receiving holes;
   the plurality of bolt receiving holes being radially positioned around the opening; and
   the plurality of bolt receiving holes traversing through the bumper.

7. The device for hose barb retention as claimed in claim 1 comprises:
   the band clamp further comprises a body, a first protruding lip, a second protruding lip, and a plurality of corresponding holes;
   the first protruding lip being positioned opposite the second protruding lip across the body;
   the first protruding lip being aligned with the second protruding lip; and
   the plurality of corresponding holes perpendicularly traversing through both the first protruding lip and the second protruding lip.

8. The device for hose barb retention as claimed in claim 1, wherein a plurality of corresponding holes of the band clamp is aligned with a plurality of bolt receiving holes.

9. The device for hose barb retention as claimed in claim 1 comprises:
   the band clamp further comprises a first edge, a body, a second edge, and a banding mechanism;
   the body extending from the first edge to the second edge;
   the banding mechanism being integrated into the body of the band clamp opposite the shaft portion; and
   the banding mechanism being positioned in between the first edge and the second edge.

10. The device for hose barb retention as claimed in claim 8 comprises:
    the banding mechanism comprises a plurality of bolts; and
    the plurality of bolts being positioned in between the body and an outer surface of the bumper.

11. The device for hose barb retention as claimed in claim 1, wherein the first threaded portion is a male threaded portion.

12. The device for hose barb retention as claimed in claim 1, wherein the second threaded portion is a female threaded portion.

13. The device for hose barb retention as claimed in claim 1, wherein the bumper is a nylon bumper.

\* \* \* \* \*